United States Patent [19]

Inoue et al.

[11] 4,276,598
[45] Jun. 30, 1981

[54] ELECTRONIC CASH REGISTER INCLUDING MEANS FOR PRODUCING PRINTED VALIDATION DATA

[75] Inventors: Haruhiko Inoue, Nagaokakyo; Syuji Nakano, Osaka, both of Japan

[73] Assignee: Omron Tateisi Electronics Co., Kyoto, Japan

[21] Appl. No.: 77,145

[22] Filed: Sep. 19, 1979

[30] Foreign Application Priority Data

Dec. 1, 1978 [JP] Japan .................................. 53-149410

[51] Int. Cl.³ .............................................. G06F 3/12
[52] U.S. Cl. .................................. 364/405; 364/900; 235/3
[58] Field of Search ...................... 364/405, 404, 900; 235/3

[56] References Cited

U.S. PATENT DOCUMENTS

| 4,095,738 | 6/1978 | Masuo .......................... 364/405 X |
| 4,142,235 | 2/1979 | Tadakuma et al. ................ 364/405 |

*Primary Examiner*—David H. Malzahn

*Attorney, Agent, or Firm*—Wegner & Bretschneider

[57] ABSTRACT

An electronic cash register including a printing member comprising a means for presetting a validation printing operation request when said cash register is needed to produce a desired validation print of a predetermined processed data, a means for generating an enable signal by which said cash register is compelled to perform the validation print, the enable signal being generated when the validation printing operation request has been preset with said presetting means and a predetermined cash register function corresponding to the predetermined processed data has been completed in said cash register, receiving means for receiving a validation paper, a detecting means coupled to the receiving means for detecting if said validation paper is present in the receiving means, and an instructing means for instructing said printing member to print said predetermined processed data on the validation paper, wherein when said validation printing request has been preset, said printing member performs printing said predetermined processed data on the validation paper and said cash register advances to the subsequent cash register function.

8 Claims, 5 Drawing Figures

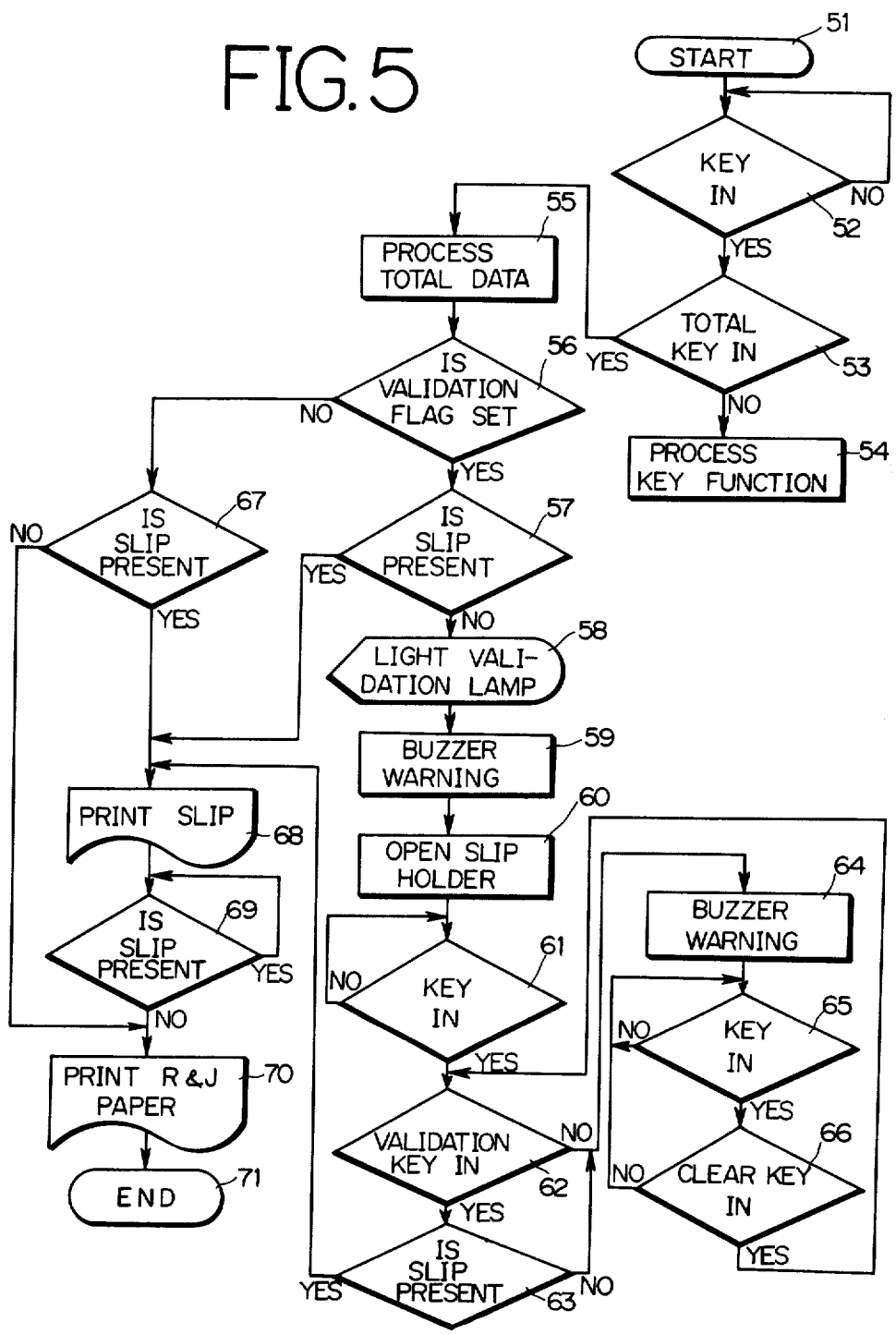

ELECTRONIC CASH REGISTER INCLUDING MEANS FOR PRODUCING PRINTED VALIDATION DATA

BRIEF SUMMARY OF THE INVENTION

The present invention relates to an electronic cash register having means for producing a validation print, and more particularly to an electronic cash register such that when the cash register has been set to produce a validation print, a cashier cannot complete a transaction with each customer without operating the validation function.

There are known electronic cash registers which include a receipt printer and a journal printer for printing input data relating to the merchandise sold, such as the amount of money, department code, total amount of money or other information to be registered, wherein the receipt and journal printers are adapted to print the input data on a receipt and a journal paper, respectively. After completion of an operation of the cash register, a printed portion of the receipt paper is cut off to be handed over to a customer, while the journal paper is wound in a roll without being cut to be stored for validation. In such known electronic cash registers, if after closing the store a clerk wants to know the total amount of purchases made by each individual customer during the day, he must make an exhaustive search over the lengthy strip of rolled journal paper to obtain a total sale of the day or to learn the assortment of purchases made by a single customer. Moreover, the clerk may want to know the sale of certain goods on bargain prices. Then he has to make a similarly lengthy search over the rolled journal paper to find out the answer. Accordingly, the prior art electronic cash registers have the disadvantage that it is troublesome and takes much time for store clerks to find out the desired data.

It is, therefore, a primary object of the present invention to provide an electronic cash register with a simple construction at low cost, which picks up desired processed data, such as the total amount of purchases made by each customer, the amounts of purchases of each specific merchandise and so forth, and produces a validation print on a predetermined validation paper without fail.

It is a further object of the present invention to provide an electronic cash register such that when the cash register has been preset to produce a validation print, it will not be advanced to subsequent function without producing a validation print on validation paper.

It is a still further object of the present invention to provide an electronic cash register such that when the cash register has been preset to produce a validation print showing the total amount of purchases made by any single customer and a total amount key has been depressed, the cash register produces the validation print on validation paper, produces total amount prints on a journal paper and a receipt paper after completion of validation printing, and completes subsequent operations.

It is another objects as well as the numerous advantages of the electronic cash register according to the present invention will become apparent from the following detailed description and the accompanying drawings, in which:

BRIEF DESCRIPTION OF DRAWINGS

FIG. 5 is a sequence of operations for producing a validation print in accordance with the embodiment of FIG. 1.

DETAILED DESCRIPTION

Figure 1:
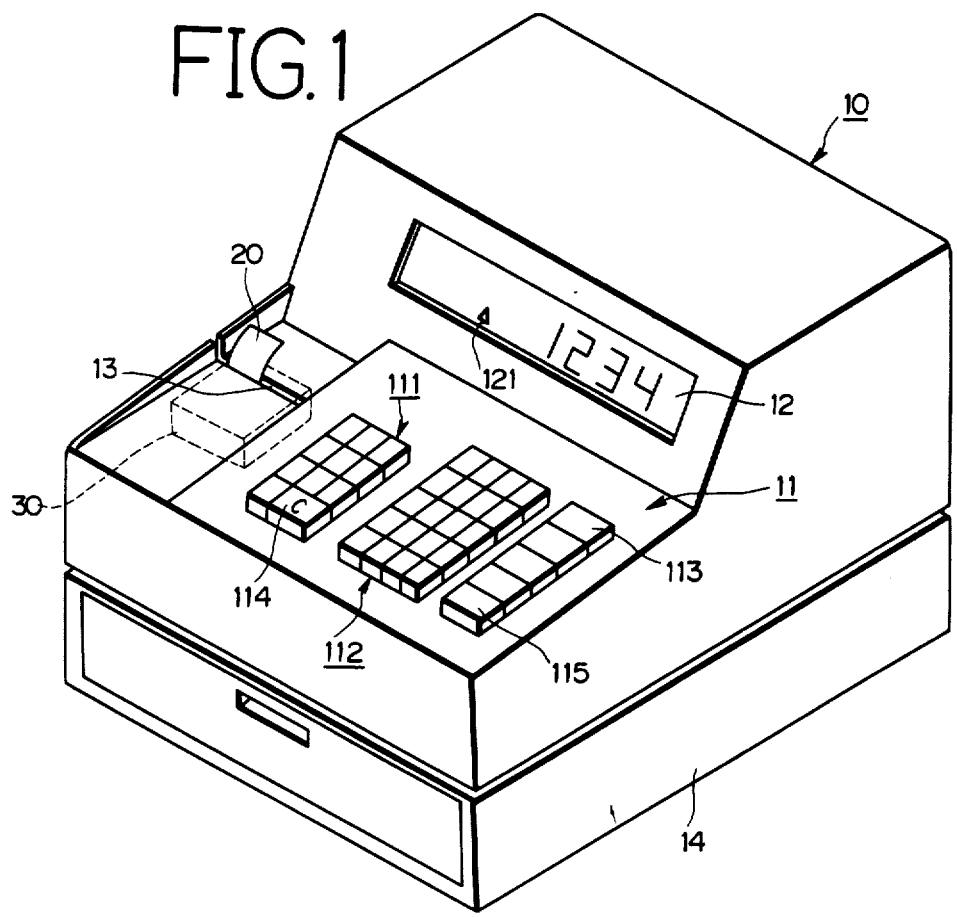
FIG. 1 is a perspective view of an electronic cash register as one embodiment of the present invention.

Referring, now, to FIG. 1, there is shown an electronic cash register 10 (hereinafter referred to briefly as ECR) as one embodiment of the present invention. The ECR 10 includes a keyboard 11, a display 12, and a printer 30. The keyboard 11 includes entry keys 111 for entering the amount of money of each item of merchandise sold, the quantity of goods sold or and other details to be registered; a clear key 114 for clearing the erroneously entered data; department keys 112 for entering the respective counter or department codes as represented by numerals 1, 2, 3, . . . 20; a validation key 113 which, on manual actuation, causes the ECR 10 to produce a validation print; and a total key 115 which, on manual actuation, causes the ECR 10 to total the itemized input sales data. The display 12 for displaying amounts of money, department code or the like includes a validation indicator lamp 121 serving as an alarm means for notifying a cashier that a validation print should be produced. The display 12, for example, may be combined with a segment display device which can distinctly display a numeral display and a validation print instruction. The validation indicator lamp 121 is in the shape of a triangle. The printer 30 is built into the ECR 10, which produces an input data print on a receipt paper 20 and a journal paper not shown in FIG. 1. An inlet 13 associated with the printer 30 is disposed on a front pannel of the ECR 10, and is adapted to receive a validation paper slip 2 to be printed with a validation print data as shown in FIG. 2.

Figure 2:
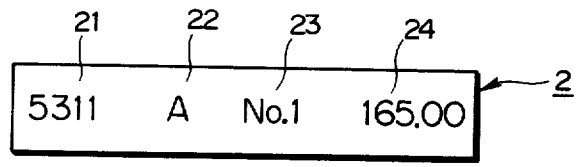
FIG. 2 shows a typical validation print paper carrying a validation print, which is employed in the electronic cash register of FIG. 1.

In FIG. 2, there is shown a typical printed validation slip 2, which has been printed with validation print data viz. predetermined processed data in accordance with the present embodiment. This printed slip 2 carries a serial or consecutive transaction count number 21, a cashier code 22, a machine number 23 of the ECR 10, and a total amount of money data 24.

Figure 3:
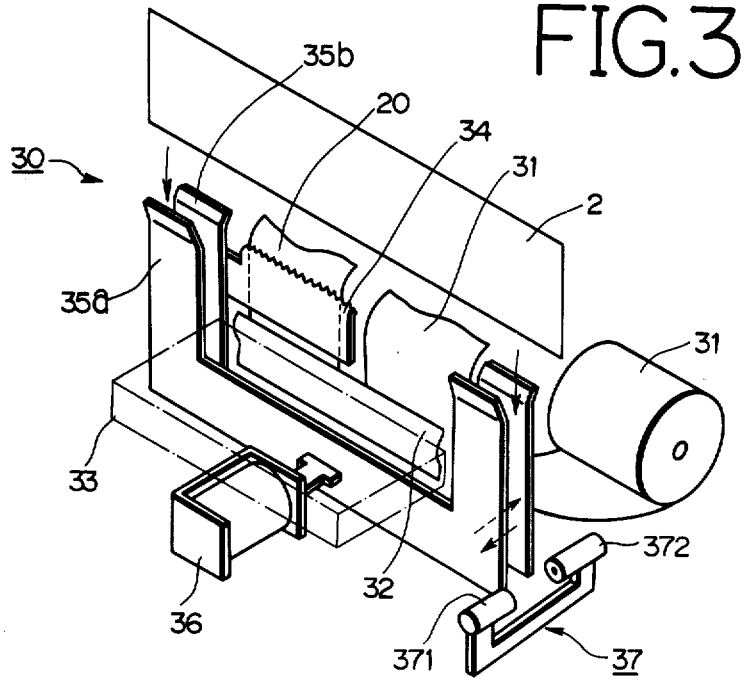
FIG. 3 is a perspective view illustrating a printer built into the electronic cash register of FIG. 1.

FIG. 3 shows a schematic view of the construction of the printer 30 built into the ECR 10 of FIG. 1. In this embodiment, the printing member for producing a validation print on the validation slip 2 as shown in FIG. 2 utilizes the printer 30 for printing the itemized purchases data on receipt paper 20 and journal paper 31. Journal supply roll 31 and receipt supply roll (not shown in drawings) are disposed coaxially and in parallel with each other for feeding the journal and receipt paper to a printing position. The journal and receipt paper are printed with input data relating to the merchandise sold through an ink ribbon 32 by a printing head 33. The printed portion of the journal paper 31 is again wound in a roll (not shown in drawings) and the printed portion of the receipt paper 20 is cut off by a cutter 34. The printer 30 includes a validation mechanism for producing a validation print on the validation slip 2 in addition to the mechanism for printing the itemized purchase data on the journal and receipt paper as described hereinafter in detail.

A pair of slip holders 35a and 35b are disposed in face-to-face relation so as to receive and support the slip 2 behind the ribbon 32. The holders 35a and 35b are normally closed. When a validation print is requested, the holder 35a is biased by an energized plunger 36 connected thereto, to move in the direction of arrow mark shown in solid line in FIG. 3 so that the holders 35a and 35b open to receive the slip. A slip detector 37 is disposed as a slip detecting means so as to detect the slip 2 which is inserted between the holders 35a and 35b.

The slip detector 37 comprises a light source 371 and a photo-electric sensor 372. While the slip 2 is not inserted into the detector 37, it will not generate an output signal indicating the presence of the slip 2. When the slip 2 is inserted between the holders 35a and 35b, the light beam from the light source 371 is blocked and the detector 37 generates an output signal, so that the plunger 36 is deenergized and the holders 35a and 35b close in response to a reset spring (not shown in drawings). If necessary, the holders 35a and 35b may be manually opened from the original closed position so as to receive the slip 2.

Figure 4:
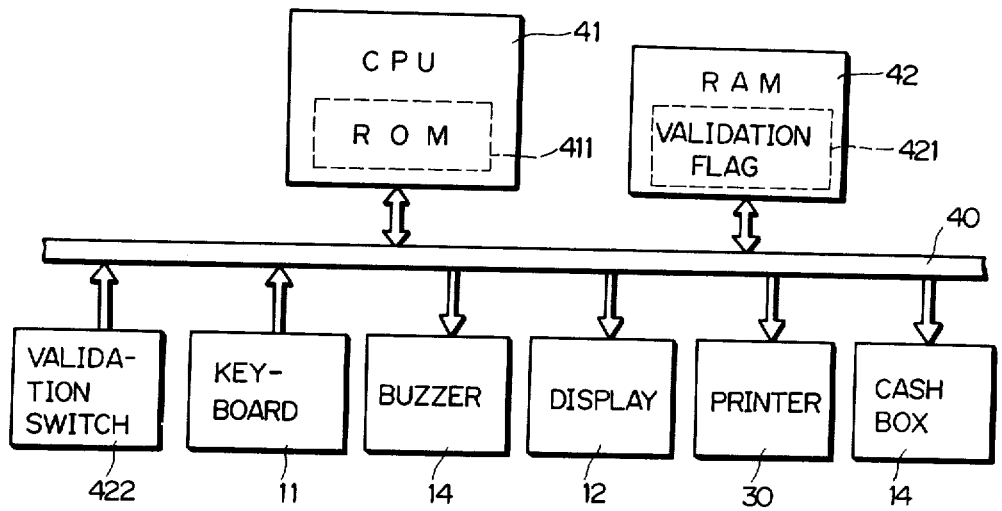
FIG. 4 is a block diagram showing a major part of the cash register of FIG. 1.

In FIG. 4, there is shown a schematic block diagram of the major portion of the ECR 10. A central processor unit (CPU) 41 includes a read only memory (ROM) 411 for storing a program for controlling all operations in the ECR 10. A random access memory (RAM) 42 is operatively associated with the CPU 41 via a bus 40 and includes a validation flag field 421 for storing a validation flag which is set by a validation switch 422 when a validation print is necessary. Via the bus 40, the CPU 41 or the RAM 42 is operatively associated with the validation switch 422, keyboard 11, buzzer 14, display 12, printer 30 and cash box 14. The validation switch 422 may be a manual switch built into the ECR 10.

FIG. 5 is a flow chart for illustrating a typical sequence of the ECR 10 in accordance with the present embodiment. Referring to FIGS. 1 to 5, the typical sequence of the ECR will be described hereinafter.

In a step 51 of FIG. 5, the validation switch 422 is preset so as to set a validation flag in the RAM 42 when a validation printing operation is requested. Conversely, when the validation printing operation is not requested, the switch 422 is preset so as not to set the validation flag in the RAM 42. Moreover, the slip holders 35a and 35b remain closed in this step. In the whole sequence as shown in FIG. 5, a predetermined processed data to be printed on the slip 2 is defined as a validation data corresponding to a total amount data as shown in FIG. 2. The normal registering operation of the ECR 10 is advanced in response to key operations on the keyboard 11. In a step 52, inquiry is made as to if a key on the keyboard 11 is depressed and, in a step 53, if the depressed key is the total key 15. When the depressed key in the step 52 is other than the total key 15, the sequence will go to a step 54 where the ECR 10 processes the data corresponding to the depressed key and advances to the subsequent registering operation. Namely, the monetary amount of the merchandise sold is entered via the entry keys 111, and the counter codes is entered via one of the department keys 112. The entered data is printed on the receipt and journal paper 20 and 31 by the printer 30 under the control of the CPU 41. When the total key 115 is depressed after entry of the monetary amount of every item of merchandise sold and of all the corresponding counter codes, the sequence will advance from the step 53 to a step 55 wherein the CPU processes the entered data to total the itemized input sales data. In a step 56, the CPU inquires if the validation flag has been set in the field 421 of the RAM 42.

When in the step 56 the validation flag has been set, the CPU 41 generates an enable signal which compels the ECR 10 to perform the validation printing operation, and the sequence will flow from the step 56 to a step 57 wherein the slip detector 37 detects if the validation slip 2 is present between the slip holders 35a and 35b. If the slip 2 has been manually inserted in the slip holders prior to the step 57 viz. just before the depression of the total key 115, the sequence will flow to a step 68 wherein the validation print is produced on the slip 2. If the slip 2 is not present in the slip holders, the sequence will flow to a step 58 wherein the validation indicator lamp 121 is lighted. At the same time, in a step 59, there goes out the buzzer 14, whereby the operator of the ECR 10 is informed that the validation printing operation should be initiated. In a step 60, the CPU 41 energizes the plunger 36 to open the slip holder 35a. The CPU 41 inquires in a step 61 if a key is depressed and in a step 62 if the depressed key in the step 61 is the validation key 113. When the depressed key is other than the validation key 113, the sequence will flow from the step 62 to a step 64 but the buzzer 14 continues to go out. When the depressed key in the step 61 is the validation key, the sequence will flow from the step 62 to a step 63 wherein the slip detector 37 detects if the slip 2 is present in the slip holders 35a and 35b. If the slip 2 is not present in the step 63, the sequence will flow to the step 64. When in response to the alarm from the validation indicator lamp 121 and the buzzer 14 the operator wants to insert the slip 2 into the slip holders 35a and 35b, he in a step 65 must depress the clear key 114 if he has depressed a key other than the validation key 113 in the step 62 or depressed the validation key 113 prior to inserting the slip 2 in the step 63. When after inserting the slip 2 he depresses the validation key 113, the buzzer 14 stops and the sequence will proceed from the step 63 to a step 68.

In the step 68, the CPU 41 transfers to the printing head 33 such validation print data as a serial transaction count number 21, cashier code 22, machine number 23 and total amount data 24 which are stored in the RAM 42, whereby the slip 2 is printed with the validation print data as shown in FIG. 2. In this step 68 to receipt and journal paper 20 and 31 are not printed with the validation print data because the paper 20 and 31 are disposed behind the slip 2. After completion of this printing, the sequence will advance from the step 68 to a step 69 wherein the CPU 41 inquires if the slip detector 37 detects the slip 2 viz. if the printed slip 2 has been taken out from the printer 30. If, in step 69, it is found that the slip 2 is not present, the sequence will flow to a step 70 wherein the CPU 41 causes the printer 30 to print the total amount of money data processed in the step 55 on the receipt and journal paper 20 and 31. The sequence will flow from the step 70 to a step 71, so that the ECR 10 advances to a subsequent cash register function, such as cash amount entry, the corresponding printing operation, arithmetic operation, etc. to complete the transaction with the individual customer.

When in the step 56 the validation flag has not been set, the sequence will flow from the step 56 to a step 67 wherein the CPU 41 inquires if the detector 37 detects the slip 2. As shown in FIG. 5, the sequence from the step 67 flows to the step 68 when the slip 2 is detected viz. the slip 2 has been manually inserted into the slip holders just before the depression of the total key 115, and skips to the step 70 when the slip 2 is not detected.

According to the present embodiment, the ECR 10 comprises the validation indicator lamp 121 and the buzzer 14 as an alarm means operatively associated with the slip detector 37 for notifying an operator that the validation slip 2 should be inserted into the slip holders 35a and 35b, the alarm being produced in response to the validation flag being set in the RAM 42 and the completion of totaling of the itemized input sales data and persisting until the validation slip 2 has just been inserted. In response to the alarm the operator can immediately insert the slip 2 into the printer 30 and depress the validation key 113, so that the validaprint may be completed simply and precisely. Moreover, the ECR 10 is so designed that once an alarm has been issued, it does not accept any subsequent data unless the operator inserts a slip 2 and depresses the validation key 113, this inoperative condition presisting until the validation print has been completed. This arrangement ensures a positive production of validation prints.

In the present embodiment, the validation print is based on the total amount of money data. Alternatively, the validation print may be based on the sales data about certain goods sold at bargain prices, and may be utilized for recording sales data which may be used in the calculation of incentives to be paid to the clerk or clerks who have sold specified merchandise. Further, the validation printing operation of the ECR according to the present invention may be utilized for producing prints on the back of an instrument such as a check.

It should be understood from the foregoing description that the validation printer for producing a validation print on the validation slip may be either a receipt printer or a journal printer which is independently disposed, or may be an independent validation printer.

According to the present invention there is provided an electronic cash register which picks up desired data from the data processed according to a predetermined function and prints the desired data on a validation slip, simply and precisely.

It should be understood that the above description is merely illustrative of the present invention and that many changes and modifications may be made by those skilled in the art without departing from the scope of the appended claims.

What is claimed:

1. An electronic cash register including a printing member for printing data on paper comprising:
 a setting means for presetting a validation printing operation request when said electronic cash register is required to produce a validation print of predetermined processed data;
 a receiving means for receiving a validation paper to be printed by said printing member with said predetermined processed data;
 a detecting means coupled to said receiving means for generating a validation paper presence signal when said validation paper is present in said receiving means;
 an instructing means for generating an instruction signal instructing the printing of said predetermined processed data on said validation paper by said printing member; and,
 a control means responsive to said setting means, said instructing means, and said detecting means for operating said printing member to print said predetermined processed data on said validation paper, said control means generating an enable signal placing said control means in a mode for printing said processed data when said setting means has been preset with a validation printing operation request and a predetermined cash register function corresponding to said processed data has been completed in said electronic cash register, said control means causing printing of said processed data by said printing member upon generation of said enable signal and in response to said presence signal from said detecting means and said instruction signal from said instructing means.

2. An electronic cash register according to claim 1 further comprising an alarm means operatively associated with said detecting means for notifying a cash register operator that said validation paper should be inserted into said receiving means, the alarm means being energized by said control means upon generation of said enable signal and in the absence of said presence signal until said validation paper is inserted and said instruction signal is generated.

3. An electronic cash register according to claim 1, wherein said printing member is a printer capable of printing itemized purchase data on paper associated with said cash register.

4. An electronic cash register according to claim 1, wherein said cash register includes a plurality of keys and said predetermined cash register function is a process which occurs on said predetermined processed data in response to a manual operation of a predetermined key selected from said plurality of keys.

5. An electronic cash register according to claim 4, wherein upon completion of printing of said predetermined processed data said control means causes said printing member to print data corresponding to said predetermined key on paper associated with said cash register.

6. An electronic cash register according to claim 5, wherein said paper is a receipt paper.

7. An electronic cash register according to claim 5, wherein said paper is journal paper.

8. An electronic cash register according to claim 1, wherein said control means causes said printing member to print said predetermined processed data on said validation paper when said validation paper has been set in said receiving means prior to completion of said predetermined cash register function, even if said enable signal or said instructing signal is not generated.

* * * * *